United States Patent [19]

Bouge et al.

[11] 4,315,839

[45] Feb. 16, 1982

[54] SPHEROIDAL ALUMINA PARTICULATES HAVING BIFOLD POROSITY AND PROCESS FOR THEIR PREPARATION

[75] Inventors: Gilbert Bouge, Salindres; Roland Jacques, Ales; Régis Poisson, Sevres; Laurent Seigneurin, Salindres, all of France

[73] Assignee: Rhone-Poulenc Industries, Paris, France

[21] Appl. No.: 124,778

[22] Filed: Feb. 26, 1980

[30] Foreign Application Priority Data

Feb. 26, 1979 [FR] France ................................ 79 04810

[51] Int. Cl.$^3$ .......................... B01J 21/04; B01J 35/08
[52] U.S. Cl. .................................... 252/448; 252/463; 423/628
[58] Field of Search ................. 252/448, 463; 423/628

[56] References Cited

U.S. PATENT DOCUMENTS 3,740,328  6/1973  Rausch .......................... 252/466 PT
3,943,070  3/1976  Mitsche .............................. 252/448

*Primary Examiner*—W. J. Shine
*Attorney, Agent, or Firm*—Burns, Doane, Swecker & Mathis

[57] ABSTRACT

Spheroidal alumina particulates having bifold porosity are prepared by (i) intimately admixing, at a pH of less than about 7.5, (a) a sol of a member selected from the group consisting of ultrafine boehmite and pseudoboehmite, said sol being devoid of amorphous alumina and the concentration by weight thereof, in content by weight of $Al_2O_3$, being between 5 and 25%, with (b) from 30 to 95% by weight, based upon the total solids content of the admixture, of spheroidal alumina particulates essentially completely in at least one of the phases eta, gamma, delta and theta, such particulates having a micropore volume ranging from about 0.4 to 1 cm$^3$/g, a specific surface ranging from about 100 to 350 m$^2$/g, and particle diameters ranging from about 1 to 50 microns; (ii) prilling said intimate admixture into spheroidal particulates and gelling the same; and then, (iii) recovering, drying and calcining said gelled particulates at a temperature of from 550° to 1100° C.

The resultant particulates having bifold porosity are useful as catalysts or catalyst supports.

36 Claims, No Drawings

SPHEROIDAL ALUMINA PARTICULATES HAVING BIFOLD POROSITY AND PROCESS FOR THEIR PREPARATION

BACKGROUND OF THE INVENTION

1. Field of the Invention

The present invention relates to spheroidal alumina particulates having bifold porosity, to the preparation of such particulates, and the use thereof as catalyst supports or carriers.

2. Description of the Prior Art

It is known to this art, e.g., from French Pat. No. 1,503,495 to prepare spheroidal alumina particles by forming according to the so-called "oil drop" or "drop coagulation" method, followed by aging, drying and calcining, from a mixture specifically comprising a boehmite sol and amorphous alumina, calcined alumina (in gamma form) and a pore-forming agent (starch and/or carbon black).

This process has numerous disadvantages: the boehmite sol and the amorphous alumina are prepared from metallic aluminum by a very expensive and complex process; furthermore, in order to obtain lightweight materials, pore-forming agents must be included. Also, it is absolutely required according to such process to effect a ripening (or aging) of the spheroidal particles in ammonia, after shaping, to obtain truly solid products. Cf. French Pat. Nos. 2,179,967, 2,185,444, 2,215,389 and 2,245,408; U.S. Pat. No. 2,492,167; German Pat. No. 1,032,728.

SUMMARY OF THE INVENTION

Accordingly, a major object of the present invention is the provision of a novel process for the preparation of novel spheroidal alumina particulates, which process is not only conspicuously devoid of the drawbacks and disadvantages outlined hereinabove, but which is well adapted for the preparation of very strong, lightweight, spheroidal alumina particulates having bifold porosity, without the necessity for having any pore-forming agent present in the starting mixture and without having to conduct any "aging" step.

Briefly, the present invention features doubly porous spheroidal alumina particulates, characterized in that same have a total pore volume of between approximately 0.55 and 1.7 cm$^3$/g, their micropore volume (consisting of pores having diameters of less than 0.06 micron) being between approximately 0.5 and 1 cm$^3$, their macropore volume (consisting of pores having diameters greater than 0.06 microns) being between approximately 0.05 and 0.7 cm$^3$/g, the average diameter of the macropores being between 0.1 and 10 microns, the specific surface of the spheroidal particulates being between approximately 80 and 350 m$^2$/g, their breaking strengths being in excess of 1 kg, and the alumina comprising same being essentially in the form of at least one of the phases of eta, gamma, delta and/or theta type.

The present invention also features a process for the preparation of such spheroidal particulates having bifold porosity, such process including:

[A] Mixing together, at a pH of less than 7.5, (i) a sol of ultrafine boehmite or pseudo-boehmite, the boehmite sol being devoid of amorphous alumina, and the concentration by weight of the sol, expressed as Al$_2$O$_3$ content, being between 5 and 25%, and (ii) in a proportion between approximately 30 and 95% by weight (with respect to the total solids content), spheroidal particulates of alumina essentially completely in the form of at least one of the phases of the group comprising eta, gamma, delta and theta (such particles having a micropore volume between approximately 0.4 and 1 cm$^3$/g, a specific surface between approximately 100 and 350 m$^2$/g, and particle diameters between approximately 1 and 50 microns);

[B] Prilling the aforesaid admixture into spheroidal particulates and gelling the same; and

[C] Recovering, drying and calcining said spheroidal particulates at a temperature of between 550° and 1100° C.

As utilized herein, the expression "sol" is intended to connote an aqueous suspension which does not decant.

DETAILED DESCRIPTION OF THE INVENTION

More particularly, the starting material ultrafine boehmites employed according to the present invention may be characterized by X-ray diffraction spectra (hereinafter, the crystallographic axes referred to are those given by B. C. Lippens, *Thesis*, Delft Technical University, 1961), and by high resolution electron microscopy. It will be appreciated that because of their perfectly ordered structure, the dimensions of the single crystals comprising same and their apparent morphology, the ultrafine boehmites are among the finest of the known crystallized materials.

According to the process of the present invention, the ultrafine boehmites employed consist of single crystals, with the dominant morphologies thereof, as revealed by Debye-Scherrer diagrams, capable of evolving or developing into fibrillar forms from lamellar forms under the process conditions employed.

The Debye-Scherrer diagrams of fibrillar ultrafine boehmites, followed by microdensity measurements on (002), evidence that the product is a boehmite comprising single crystals developed essentially in a single crystallographic direction, with the geometry of said single crystals developing into long and narrow ribbons (reflections (020) and (125) highly attenuated, (105) of normal intensity), to long and very narrow ribbons (reflections (hkl) absent, a halo on (012) and a clear (200) reflection). The direction of elongation of the single crystals is that of imaginary double polymeric chains for a well crystallized boehmite, corresponding to the a axis. In this direction, the single crystals have dimensions between approximately 500 and 5000 Å (Warren and B.E.T. methods) and in the two other crystallograhic directions the dimensions are between approximately 10 and 100 Å (estimated by the results of the B.E.T. method).

The electron microdiffraction diagram of the ultrafine fibrillar boehmite is characteristic of a product frequently oriented by the joining of the fibrils into bundles (or fibers).

The fibrillar ultrafine boehmites dried at 110° C. have specific surfaces between approximately 50 and 600 m$^2$/g (measured by the B.E.T. method).

The Debye-Scherrer diagram of lamellar ultrafine boehmites displays numerous reflections characteristic of tabular faces also exhibiting the (002) cleavage corresponding to the oxydril planes of boehmite well crystallized in the form of:

[i] rhombic platelets (reflections (002) and (105), partially extinct, (008) totally extinct),

[ii] elongated rhombic platelets, likely in the (110) direction ((020) doublet, (105) unresolved, reflections (002) and (008) of normal intensity),

[iii] long and broadened ribbons (reflections (002) partially extinct, (008) and (105) completely extinct).

Further, the application of the Warren method to these lamellar ultrafine boehmites evidences that the crystals exhibit at least two directions of growth, between approximately 100 and 5000 Å, the thickness of the crystals in the third direction typically being smaller and approximately between 20 and 100 Å. Their specific surfaces after drying at 110° C. is between 100 and 300 m²/g.

The sol of ultrafine boehmite admixed according to the invention is free of amorphous alumina.

The ultrafine boehmite sols employed in the process of this invention may desirably be prepared in accordance with the processes described in French Pat. Nos. 1,261,182 and 1,381,282.

French Pat. No. 1,261,182 features a process for the preparation of ultrafine boehmite by heating an aqueous dispersion of alumina in the presence of a monovalent acid radical, said aqueous dispersion of alumina being prepared from a basic aluminum chloride, a basic aluminum nitrate, aluminum hydroxide, and an alumina gel or a colloidal alumina solution. Such a product is commercially available from E. I. duPont de Nemours under its trademark Baymal, and is a fibrillar ultrafine boehmite having a specific surface on the order of from 250 to 350 m²/g.

The fibrillar ultrafine boehmites dried at 110° C. have specific surfaces between approximately 50 and 600 m²/g (measured by the B.E.T. method).

The Debye-Scherrer diagram of lamellar ultrafine boehmites displays numerous reflections characteristic of tabular faces also exhibiting the (002) cleavage corresponding to the oxydril planes of boehmite well crystallized in the form of:

[i] rhombic platelets (reflections (002) and (105), partially extinct, (008) totally extinct),

[ii] elongated rhombic platelets, likely in the (110) direction ((020) doublet, (105) unresolved, reflections (002) and (008) of normal intensity),

[iii] long and broadened ribbons (reflections (002) partially extinct, (008) and (105) completely extinct).

Further, the application of the Warren method to these lamellar ultrafine boehmites evidences that the crystals exhibit at least two directions of growth, between approximately 100 and 5000 Å, the thickness of the crystals in the third direction typically being smaller and approximately between 20 and 100 Å. Their specific surfaces after drying at 110° C. is between 100 and 300 m²/g.

The sol of ultrafine boehmite admixed according to the invention is free of amorphous alumina.

The ultrafine boehmite sols employed in the process of this invention may desirably be prepared in accordance with the processes described in French Pat. Nos. 1,261,182 and 1,381,282.

French Pat. No. 1,261,182 features a process for the preparation of ultrafine boehmite by heating an aqueous dispersion of alumina in the presence of a monovalent acid radical, said aqueous dispersion of alumina being prepared from a basic aluminum chloride, a basic aluminum nitrate, aluminum hydroxide, and an alumina gel or a colloidal alumina solution. Such a product is commercially available from E. I. duPont de Nemours under its trademark Baymal, and is a fibrillar ultrafine boehmite having a specific surface on the order of from 250 to 350 m²/g.

French Pat. No. 1,381,282 specifically describes a process for the preparation of ultrafine boehmite which consists of producing, at a temperature between 60° and 150° C., a suspension or a cake of amorphous, hydrated alumina gel containing up to 35% by weight alumina, expressed in $Al_2O_3$, and with respect to this alumina, expressed in $Al_2O_3$ molecules, an amount of ions of monovalent acids varying from 0.05 to 0.5, such production being over a period of time of from 15 hours to 10 days, the cake being obtained by centrifuging, washing and filtering the alumina gel which is continuously precipitated at a pH between 8 and 9 from a solution of sodium aluminate and nitric acid. The specific surface of these products typically varies from 200 to 600 m²/g. The ultrafine boehmites obtained by this process are generally free of any lamellar configuration and thus have the crystallographic characteristics noted hereinabove for fibrillar ultrafine boehmites, consisting of single crystals in the form of long and very narrow ribbons.

According to a preferred embodiment of the invention, such fibrillar ultrafine boehmites are used as starting materials.

The pseudo-boehmite employed in the process of the invention specifically connotes the essential component of the alumina suspensions obtained by acid precipitation of an alkaline alumina solution, or by the basic neutralization of alumina salts. It consists in moist state of unstable floccules swollen with water. The aging of same is accompanied by a reduction in swelling and expulsion of water (syneresis).

The results of X-ray diffraction, microdiffraction and electron microscopy, together with infrared spectrography appear to indicate that in these floccules only pseudo-crystallize, very imperfect, highly solvated microdomains, joined together by intermolecular forces and always limited, are developing. The extent, orientation, the degree of solvation and the crystalline order of these microdomains are variable depending on the conditions of precipitation, thus leading to various products having the same loose and imperfect microstructure, ressembling that of boehmite and identified by means of X-ray diffraction as pseudo-boehmite b, a or recrystallized.

Pseudo-boehmite b designates the least developed structure. In this case, the pseudo-crystallized microdomains are highly disrupted by the inclusion of impurities that are always present and, especially in the c direction with reference to boehmite, perpendicularly to the direction a of the elongation direction a of polymer molecules (absence of the (002) halo and very low intensity of all halos present).

The a or normal pseudo-boehmite, of greater purity, is in a more advanced state of crystallization in the microdomains than the b form and exhibits an order of but very short range in the three crystallographic reference directions (the (002) halo rather intense and located between 6.40 and 6.80 Å, is present with the series of halos in the position of the reflections of boehmite).

Recrystallized boehmite, also designated the "intermediate product between boehmite and boehmite gel" (B. C. Lippens, *Thesis*, Delft Technical University, 1961) differs from the pseudo-boehmites b and a by the following characteristics:

[i] interference value (002) between 6.25 and 6.40 A (corrected value),

[ii] appreciable reduction of the (002) halo in the form of a band,

[iii] strongly enhanced intensities at the location of the (002) band, and the halos (012), (014), (103) and (020) and (105).

The concentration by weight in alumina in the sol, expressed as $Al_2O_3$ content, is between approximately 5 and 25%, and preferably between 10 and 15%. However, it may vary outside of this range, when, in a known manner, the viscosity of the mixture is adjusted between the sol and the spheroidal alumina particles, prior to the forming stage.

According to the process of the invention, there are added to the ultrafine boehmite or pseudo-boehmite sol, in a proportion between 30 and 95% by weight, and preferably between 65 and 90% by weight (with respect to total solids) of spheroidal alumina particles essentially completely in either eta, gamma, delta, or theta state phase, the particles having a micropore volume between approximately 0.4 and 1 $cm^3/g$. When lightweight products having a large micropore volume are desired, it is preferred to utilize spheroidal particles having a micropore volume between 0.7 and 1 $cm^3/g$.

The admixture is effected at a pH less than 7.5, preferably between 3 and 7, and most preferably between 4 and 7.

The diameters of the spheroidal alumina particulates employed should be between approximately 1 and 50 microns, and preferably between 5 and 10 microns. The preferred range is characteristic of the majority of the spheroidal particles advantageously utilized, and preferably to more than 90% of same.

And without wishing to be bound by the following theory, it appears that for a given particle diameter, a maximum macropore diameter and maximum macropore volume in the final product spheroidal particulate are obtained when the grain size distribution of the particles is the most restricted; a given sphere then has maximum strength for these values of diameter and volume of the macropores. Thus, according to a preferred embodiment of the invention, the diameter $\phi$ of the spheroidal particles is such that at least 50%, and preferably 70%, of the particles have diameters $\phi$ on the order of an average value $\phi_M$, such that $\phi = \phi_M \pm 20\% \phi_M$. The particles employed may be either ground or unground.

Furthermore, the shape of the particles should be essentially spheroidal; the finished product will thus have increased breaking strength.

The spheroidal alumina particulates having the properties described hereinabove may be prepared specifically by any one of the following processes (the pH values noted hereinafter having been measured at 25° C.).

An aqueous solution of an aluminum salt is precipitated by means of an alkaline aluminate solution, the precipitate obtained is atomized and then placed in suspension in an aqueous solution having a pH between 4.5 and 7, the alumina sludge obtained is atomized and dried, and the product then washed, dried and calcined. Compare U.S. Pat. No. 3,520,654.

The spheroidal alumina particles employed according to the process of the invention may also be obtained by the precipitation of an alumina gel at a pH between 7.5 and 11, followed by washing, centrifuging, suspending and rapid dehydration of the product in a stream of hot gas having an inlet temperature between approximately 350° and 1000° C., and thence followed by calcination. Compare French Pat. No. 2,221,405.

The spheroidal alumina particles utilized according to the invention may also be obtained by precipitation of an alumina gel at a pH between 7 and 10.5, by aging the precipitate at a pH between 10 and 11, by homogenization and atomization at 250°–550° C. of the resultant slurry, followed by calcination. Compare British Pat. No. 888,772.

The spheroidal alumina particles utilized according to the invention may also be obtained by precipitating an alkaline aluminate with a mineral acid at a temperature between 30° and 75° C., by aging it in a second reactor at 35°–70° C. at a pH of about 7, by recycling the slurry obtained into the mixing reactor, and by filtering, washing and drying the product by means of atomization, followed by calcination. Compare U.S. Pat. No. 3,360,670.

In a general manner, the spheroidal alumina particles may be prepared by rapid dehydration, in a stream of hot gas, of an aqueous suspension of ultrafine boehmite, pseudo-boehmite and/or amosphous alumina, followed by calcination. However, this treatment does not always provide, after drying and calcination, particles having the desired microporosity consistent with the invention. To remedy this problem, the spheroidal alumina particles utilized according to the process of the invention may also be obtained by treating, with a base decomposeable into volatile products, of aqueous dispersions of ultrafine boehmite, of pseudo-boehmite and/or of amorphous alumina in order to provide same with the microporosity desired. The treatment of the dispersion if effected prior to the stages of drying and calcining, so as to adjust the pH of the treatment medium to a value of about 9, and preferably between 8 and 9.5. Representatives bases decomposeable into volatile products as to be operable consistent with this embodiment of the invention are, especially, ammonia, ammonium carbonate and the various amines; the expression decomposeable into volatile products signifies that the bases are eliminated from the products being treated during the operations downstream of drying and calcination.

According to another preferred embodiment of the invention, spheroidal alumina particles prepared by the following process are utilized: an aqueous alumina suspension is prepared, at least partially in the form of ultrafine boehmite, by treating an active alumina powder having a poorly crystallized and/or amorphous structure in an aqueous medium having a pH of less than 9; the treatment of the suspension may be effected by means of a base also decomposeable into volatile products, such as those described hereinabove. The suspension is then dried, preferably by atomization, such that the grain size distribution of the final product may be controlled; the latter is then calcined at a temperature between approximately 550° and 1100° C.

The active alumina powder utilized in this preferred embodiment of the invention is preferably obtained by the rapid dehydration of aluminum hydroxides or oxyhydroxides and, more particularly, of hydrargillite in a stream of hot gas; the dehydration may be effected in any suitable apparatus by means of a stream of hot gas. The inlet temperature of such gases in the apparatus typically varies from about 400° to 1200° C., and the contact time of the hydroxide or oxyhydroxide with the hot gas typically being between a fraction of a second and 4–5 seconds; see the process for the preparation of an active alumina powder described in French Pat. No. 1,108,011.

By alumina having a "poorly crystallized structure" there is intended an alumina which by X-ray analysis, provides a spectrum having but one or a few diffuse rays corresponding to the crystalline phases of low temperature transition alumina, i.e., essentially of the phases chi, rho, eta, gamma.

An alumina having an amorphous structure is hereby defined as any alumina which by X-ray analysis, provides a spectrum having no peaks characteristic of any crystalline phase.

The specific surface of the active alumina employed typically varies between approximately 200 and 400 $m^2/g$, the diameter of the particles is typically between approximately 0.1 and 300 microns, and preferably between 1 and 120 microns, and the ignition loss of such an alumina as measured by calcination at 1000° C. typically varies between 3 and 15%, which corresponds to a molar ratio of $H_2O/Al_2O_3$ between 0.17 and 0.85.

This alumina advantageously has, or is treated to have, a sodium hydroxide content, expressed as $Na_2O$, of less than 1000 ppm.

The alumina may be ground or unground; ofttimes advantageously, the active alumina powder consists of particles having a diameter between approximately 1 and 20 microns.

The active alumina powder may be treated in vapor or in liquid phase. Preferably, the treatment is effected in the liquid phase. Further, such treatment is conducted under agitation.

The aqueous medium utilized may consist of water, and/or of acid, and/or of a salt which dissociates in water releasing anion, to yield a solution having a pH less than 9, the anion preferably being a monovalent anion.

The acids employed may be water soluble strong or weak acids. Same may be mineral or organic acids; among the organic acids, the monocarboxylic, dicarboxylic and halogenated acids are suitable, when soluble in water. Especially preferred are: hydrochloric acid, nitric acid, perchloric acid, sulfuric acid, iodic acid, hydrobromic acid, formic acid, acetic acid, propanoic acid, oxalic acid, maleic acid, succinic acid, glutaric acid, and chloro- and bromoacetic acids.

Among the salts that may be employed, exemplary are the nitrate, chloride, formate, acetate, and oxalate anions, and, more particularly, ammonium, sodium and aluminum nitrates, ammonium acetate, ammonium chloride and ammonium formate.

The alumina concentration in the aqueous medium, expressed in terms of $Al_2O_3$, is less than approximately 50% by weight, and is preferably between 2 and 20% by weight.

The ratio of the molar concentration of anion to that of alumina may vary over a wide range; however, a ratio of less than 6 is preferred.

The temperature for the treatment of the active alumina powder is higher than approximately 80° C., preferably is between 120° and 225° C., and more preferably is between 130° and 180° C. The treatment is preferably effected under reflux or in an autoclave, in order to prevent the escape or release of reagents and of water. Under these conditions, the pressure is higher than atmospheric, advantageously between 1 and 25 bars, and more preferably is between 2.5 and 10 bars.

The reaction time must be adequate for the generation of the desired ultrafine boehmite under the conditions existing in the medium and for the temperature selected. Under the preferred conditions, the reaction time advantageously varies between 2 and 72 hours, and more preferably is between 6 and 24 hours. It should be understood that the reaction time may be shortened as the temperature increases. The temperature and the reaction time specifically affect the yield of the resultant ultrafine boehmite.

In this manner, there is obtained an aqueous suspension of alumina, at least a fraction of which being ultrafine boehmite, e.g., from 5% to 100%, preferably from 40% to 100%, and most preferably from 60% to 100%. See also copending application, Ser. No. 124,777, filed February 26, 1980, assigned to the assignee hereof.

The crystalline fraction of such alumina may be confirmed by X-ray diffraction and electron microscopy at high resolution to be ultrafine boehmite, the different characteristics thereof having been described hereinabove.

Depending upon the conditions of use, the ultrafine boehmites obtained consist of single crystals having dominant morphologies as detected by Debye-Scherrer diagrams, and may develop lamellar forms from fibrillar forms, with the different characteristics thereof also having been given hereinabove.

According to the process of the present invention, the alumina constituting the spheroidal particles used in the mixture preferably should be at least in one of the gamma, delta, theta forms, i.e., the products originating from the different manufacturing processes specifically described hereinabove must have been calcined at a temperature between approximately 500° and 1100° C. The utilization in the admixture of spheroidal particles calcined at 550°–1100° C. limits shrinkage during the calcination of the final product; it also makes it possible, by selecting a temperature for the calcination of the spheroidal particles closely approximating that to be encountered during ultimate use of the final products, to prevent excessive thermal aging of the final products upon such ultimate use thereof. Thus, according to another preferred embodiment of the invention, and when spheroidal alumina particulates of bifold porosity and excellent thermal stability at elevated temperatures are desired, it is preferred to include in the beginning admixture spheroidal alumina particles calcined at a high temperature, alumina that is then essentially in the delta and/or theta form.

According to the second stage of the process according to the invention, the shaping or forming operation is effected by a coagulation of droplets of the admixture. Shaping in the spheroidal form and the gelification of the drops may be obtained by several different methods, and especially by the processes to be described hereinbelow.

According to a first process, the droplets of the admixture are introduced into a liquid immiscible with water such that the droplets form essentially spherical particles; these particles are simultaneously coagulated, or are coagulated upon being shaped into spheroids, by means of a gelling agent which removes the stabilizing ligands.

The liquid immiscible with water may be such that the droplets descend (density of the liquid is less than the density of the droplets) or ascend (density of the liquid is greater than that of the droplets) therein; as examples of liquids immiscible with water and suitable for purposes of the subject process, the following are illustrative: petroleum, kerosene, dodecylbenzene, trichloroethylene, perchloroethylene, organic solvents, hydrocarbons and mineral oils, and the like.

Representative of gelling agents which remove the stabilizing ligands are ammonium chloride, ammonia, ammonium carbonate, long chain fatty amines (particularly those marketed under the trademark, Primene), hexamethylene tetramine, urea, etc.

The drops treated in this manner are thence recovered from their shaping and/or coagulating medium.

According to one preferred embodiment of the invention, the droplets of the admixture are introduced into a column containing an upper phase consisting of petroleum and a lower aqueous phase consisting of an ammonia solution. The shaping process takes place in the upper phase and the gelification essentially in the lower phase. The temperature of the petroleum is advantageously close to ambient temperature. The ammonia solution must have a pH maintained above approximately 9. The retention time of the drops in the ammonia amounts to a few minutes and is typically less than 15 minutes. Under these conditions, the recovered spheroidal particulates are sufficiently strong and are not deformed during subsequent operations. Two new advantages of the process according to the invention especially manifest themselves during this stage of spheroidal shaping and gelification: the shaping process takes place at ambient temperature and, furthermore, gelification occurs very rapidly; it is thus absolutely necessary to effect the subsequent aging of the spheroidal particulates in a basic solution, same are sufficiently strong after but a short period of time in the ammonia phase.

According to a second embodiment the droplets of the admixture are introduced (placed in suspension) into an immiscible liquid, capable of removing the water from the drops. This immiscible liquid extracts water from the drops and causes them to gel in spheroidal form; for this purpose, for eample, 2-ethyl-1-hexanol or a long chain fatty aliphatic alcohol marketed under the trademark Octylol may be used. The principal stages and apparatus suitable for such embodiment are well described in articles by P. A. Haas, F. G. Kitts and H. Bentler, in *Chemical Engineering Progress Symposium Series* 1967, 63, No. 80, pp. 16–27 and by I. Amato and D. Martorana in *Rev. Int. Hautes Temp. et Refract*, 9, pp. 197–204 (1972).

According to a third embodiment, the admixture obtained in stage [A] of the process of the invention is mixed with at least one water-soluble monomer, the non-cross-linked polymer thereof being soluble in water or which forms a gel; the mixture obtained is then dispersed in droplet form in a hot, fluid medium wherein substantial polymerization of the monomer takes place. The monomer may be an acrylic compound having the structural formula:

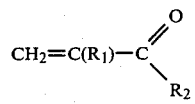

wherein $R_1$ is H or a methyl radical, $R_2$ and $OR_3$ or $NR_4R_3$ radical, $R_3$ and $R_4$ represent H or a hydrophilic radical, particularly an hydroxyalkyl radical, advantageously one having from 1 to 2 carbon atoms, or a methoxymethyl radical. The principal stages of this particular process are described in French Pat. Nos. 2,261,056 and 2,261,057.

The spheroidal particulates obtained are subsequently separated from the gelification medium, dried and calcined at a temperature ranging from about 550° to 1100° C.

The spheroidal particulates obtained in this manner have a total pore volume between approximately 0.55 and 1.7 cm$^3$/g; their micropore volume (consisting of the pores having diameters of less than 0.06 microns) is between approximately 0.5 and 1 cm$^3$/g; their macropore volume (consisting of the pores having diameters greater than 0.06 microns) is between approximately 0.05 and 0.7 cm$^3$/g; the average diameter of the macropores is between 0.1 and 10 microns, with the specific surface of the spheroids being between approximately 80 and 350 m$^3$/g (BET method; product dried at 110° C.); their breaking strength is greater than 1 kg; and the alumina is essentially completely in the form of at least one of the phases of the group comprising the eta, gamma, delta and theta phases.

Also without wishing to be bound by this particular theory, it appears that the double or bifold porosity of the spheroidal particulates according to the invention is such that their microporosity results from the microporosity of the spheroidal alumina particles and the sol employed, and their macroporosity from the interparticle voids of the mixture. In other words, the microporous structure resulting from the assemblage of the microporous particles, the compactness, and the grain size distribution of the particles, determine the macropore volume and the size of the macropore. It is one of the advantages of the process according to the present invention that it provides light-weight products (i.e., having a high pore volume) having bifold porosity and which are very strong, without the necessity for addition of pore-forming agents, emphasizing either microporosity or macroporosity. It may be assumed that the sol utilized, generally speaking, does not clog the interparticle voids (thus providing a certain macroporosity) and sufficiently assures a good bonding between the particles as to obtain a very strong product, with a highly homogeneous compacting of the particles.

Furthermore, the spheroidal particulates of the invention have bifold porosity, i.e., a certain volume, designated macroporous, consisting of pores having diameters in excess of 0.06 microns and a certain volume, designated microporous, consisting of pores having diameters of less than 0.06 microns. The process of the invention makes it possible to manufacture spheroidal particulates having micropores and macropores with diameters varying over wide limits; thus, the manufacture of bimodal products is enabled, the diameters and/or the micropore and macropore volumes whereof may be varied independently. An additional advantage of the process of the invention is thus manifested in the ease of controlling the pore distribution of the product desired, as a specific function of the characteristics required for the intended application.

The specific surface, measured by the BET method, of the spheroidal particulates obtained by the process of the invention is between approximately 80 and 350 m$^2$/g. Their rupture strength is in excess of about 1 kg. This strength is determined as the arithmetic mean of 10 tests, of the force required to shatter a spheroid having a diameter of approximately 3.5 mm, upon application of a continuously progressive force beginning at zero stress.

The process according to the present invention also makes it possible to obtain spheroidal particulates having a restricted grain size distribution, which can be translated into a minimum charging loss and optimum catalytic activity throughout use.

Generally, the spheroidal particulates obtained according to the invention have a remarkable resistance to attrition. Very strong resistance to attrition, on the order of 100%, may be obtained.

Furthermore, the thermal stability of the particulates obtained by the process of the invention is excellent. In particular, their specific surface, measured after calcination for 24 hours at 982° C., is typically higher than 90 m$^2$/g; after such a heat treatment, their resistance to attrition and their mechanical strength remain practically unaffected and their shrinkage remains typically less than 4%.

The spheroid particulates according to the invention may be employed in adsorption techniques or in catalysis, and in particular in reactions wherein diffusion due to macropores must be high. Thus, the lightweight alumina spheroids of bifold porosity of the invention may be used as catalysts, or as catalyst supports to effect different reactions, such as, for example, dehydration, hydrosulfurization, hydrodenitrification, desulfurization, dehydrohalogenation, reforming, vapor reforming, cracking, hydrocracking, hydrogenation, dehydrogenation, the dehydrocyclization of hydrocarbons and other organic compounds, oxidation and/or reduction reactions, the Claus reaction, etc. The subject particulates are particularly effective as catalyst supports for the treatment of the exhaust gases of internal combustion engines, or the purification of residual industrial gases. When same are used as catalyst supports for the treatment of the exhaust gases of internal combustion engines, their combination with precious metals of Group VIII of the Periodic Table, most particularly, affords catalysts of extremely high performance characteristics and having excellent thermal stability; in the latter case, in particular, it may be advantageous, in view of the temperatures of intended use, to employ in the process of the invention spheroidal alumina particles essentially in the delta and/or theta form.

Furthermore, as is well known to those skilled in this art, the alumina supports according to the invention may advantageously be stabilized to improve their resistance to elevated temperatures. Appropriate stabilizing agents, desirably, are those selected from among at least one of the elements of the group comprising the alkaline earth metals, silicon and the rare earths.

In order to further illustrate the present invention and the advantages thereof, the following specific examples are given, it being understood that same are intended only as illustrative and in nowise limitative.

EXAMPLE 1

Spheroidal alumina particulates having bifold porosity according to this invention were prepared in the following general manner, with the data characterizing such preparations being reported in the Table I which follows:

First, a sol of ultrafine boehmite was prepared in the following manner:

A cake of alumina gel was prepared by continuous precipitation of a sodium aluminate solution displaying the ratio by weight of $Al_2O_3/Na_2O$ of approximately 1.08 and having a concentration of 100 g/l, expressed as $Al_2O_3$, with a nitric acid solution, such that the suspension contained approximately 50 g/l alumina, calculated as $Al_2O_3$, and that the calculated molecular ratio $NO_3/Al_2O_3$ was 0.16. The pH of precipitation was, at this point, about 9; the cake of gel prepared in this manner were centrifuged, filtered and washed. Same was then heated for 24 hours at 115° C. in an agitated autoclave. The resultant product was in the form of a paste containing 12% by weight alumina, calculated as $Al_2O_3$.

The specific surface of the resultant product, measured by the BET method, after drying in an oven at 110° C., was approximately 300 m$^2$/g, while its geometric surface, measured after drying and obtained by dispersion in isopropanol, azeotropic distillation and evaporation of the isopropanol, was approximately 550 m$^2$/g. An electron micrograph of the product revealed that it consisted of completely fibrillar, ultrafine boehmite constituted by single crystals in the form of long and very narrow ribbons frequently combined in bundles, the single crystals of which having longitudinal dimensions of approximately 500 to 1000 Å; in the two other directions, assuming a cylindrical shape for the single crystals, an average diameter of 55 Å was derived from specific surface measurements by the BET method. The Debye-Scherrer diagrams of the product reflected the absence of (hkl) reflections, a (012) halo and a clear (200) reflection.

Spheroidal alumina particulates were also prepared via one of the following processes (1), (2) and (3):

(1) In a reactor maintained at a temperature of 35° C., an alumina gel was continuously precipitated from a pH 8.7 sodium aluminate solution, said solution having a solids content of 100 g/l alumina, calculated as $Al_2O_3$, by means of a 1 N nitric acid solution. The suspension of the alumina gel recovered from the reactor was transferred to a closed vessel, also maintained at 35° C., for homogenization, and then was passed onto a filter; the filter cake obtained was washed with changing water until the presence of ions had disappeared from the filtrate, and was then centrifuged. The centrifuged filter cake was subsequently placed in suspension by agitation in changing water and was next pulverized by means of a gas nozzle at the base of a dehydration apparatus. The inlet temperature of the gas was 650° C., the outlet temperature thereof was 300° C., and the contact time was approximately 1 second. The spheroidal particles obtained had diameters of less dhan approximately 50 microns and 70% of the particles had a diameter of less than 16 microns. The particles were calcined at 950° C. for one hour, with the alumina then being essentially in theta phase form. Such particles had a pore volume of 0.90 cm$^3$/g and a specific surface of 140 m$^2$/g.

(2) Activated alumina was prepared by rapid dehydration of hydrargillite in a fluid bed reactor, the flow of hot gases having an inlet temperature of approximately 800° C. and with the contact time being approximately ½ second. The alumina thus prepared had a specific surface of 300 m$^2$/g, an ignition loss of 4%, and an X-ray diffraction pattern thereof indicated that a poorly crystallized alumina was present, displaying particularly diffuse rays toward 2.40 Å and 1.40 Å, which are common to the gamma, eta, chi transition alumina phases. The dimensions of the particles were such that 70% had a diameter of less than 17 microns.

Fifty g of the activated alumina were introduced into an autoclave containing 1 liter of an aqueous nitric acid solution having a pH of 0.85, such that the $NO_3/Al_2O_3$ molar ratio was equal to 0.3. The autoclave was agitated; same was then heated to 130° C. for 8 hours.

An alumina suspension containing ultrafine boehmite in fibrillar form was obtained, the conversion rate being approximately 40%.

Transmission electron microscopy of this alumina suspension revealed that the crystallized fraction consisted of ultrafine boehmite completely in fibrillar form, the individual crystals being in the shape of long and narrow ribbons having lengths of approximately 2000 to 2500 Å and widths and thicknesses of approximately 20 to 50 Å.

The alumina suspension was dried by atomization in a stream of hot gas having an inlet temperature of between approximately 700° to 800° C.

The spheroidal particles obtained were subsequently calcined at 950° C.; the alumina was crystallized essentially completely in theta phase. The product had a specific surface of 110 m²/g and a pore volume of 0.48 cm³/g. The grain size distribution thereof was such that 50% of the particles had a diameter, $\phi$, with an average value of $\phi_M = 7$ microns, such that $\phi = \phi_M \pm 20\% \phi_M$.

(3) The suspension of the fine boehmite obtained in (2) was diluted and treated with an ammonia solution such as to adjust its pH to approximately 9. The suspension was then dried and calcined under the same conditions as described in (2). The particles obtained had the same grain size distribution and the same specific surface; their pore volume was 0.60 cm³/g.

The sol of the ultrafine boehmite was mixed with different proportions of spheroidal alumina particles prepared according to processes 1, 2 and 3, at a pH of between 6 and 7.

Droplets of this mixture were formed using calibrated tubes having an inner diameter of approximately 2.5 mm. The droplets were dripped into a column 600 mm in diameter containing an approximately 6 cm layer of petroleum floated upon an ammonia solution having a concentration of approximately 20 g/l. The retention time of the droplets in the ammonia solution was approximately 2 minutes. The droplets attained a more spheroidal shape in the petroleum and were gelled in the ammonia solution. The resultant spheroidal particulates were highly rigid and survived the transfer operations without deformation; same were then dried and calcined at 950° C. for one hour. The final products had diameters of approximately 3.5 to 4 mm.

The properties of the resultant spheres are reported in the Table I which follows:

TABLE I

| | | Spheroidal particulates | | |
|---|---|---|---|---|
| | | 1 | 2 | 3 |
| Initial sol | Alumina concentration, calculated as Al₂O₃ | 12 | 12 | 13 |
| Spheroidal particulates | Alumina phase | theta | theta | theta |
| | Micropore volume, in cm³/g | 0.90 | 0.48 | 0.60 |
| | Specific surface, in m²/g | 150 | 110 | 110 |
| | Average diameter, $\phi_M$, of particulates, in μ | 9.5 | 7 | 7 |
| Mixture of formation | pH | 6 | 7 | 7 |
| | Proportion of spheroidal particles with respect to initial sol (with respect to total solids, calculated as Al₂O₃ | 50 | 76 | 76 |
| | Calcination temperature of the particulates, in °C. | 950 | 950 | 950 |
| Proportions of resultant spheroidal particulates | Total pore volume, in cm³/g | 0.90 | 0.85 | 1.16 |
| | Micropore volume, in cm³/g | 0.80 | 0.50 | 0.62 |
| | Macropore volume, in cm³/g | 0.10 | 0.35 | 0.54 |
| | Average macropore diameter, in μ | 1.2 | 1.7 | 1.7 |
| | Specific surface, in m²/g | 150 | 100 | 99 |
| | Breaking strength, in kg | 5 | 6 | 4.5 |

EXAMPLE 2

The dually porous, spheroidal alumina particulates according to the invention were prepared utilizing the ultrafine boehmite sol described in Example 1 and said resultant particulates displayed the properties reported in the following Table II.

The technique of preparation was that illustrated in Example 1; the operating conditions are also reported in Table II:

TABLE II

| | | Spheroidal particulates | | | |
|---|---|---|---|---|---|
| | | 4 | 5 | 6 | 7 |
| Initial sol | Alumina concentration, calculated as Al₂O₃ | 12 | 12 | 12 | 12 |
| Spheroidal particulates | Alumina phase | theta | theta | theta | theta |
| | Micropore volume, in cm³/g | 0.60 | 0.60 | 0.60 | 0.60 |
| | Specific surface, in cm²g | 110 | 110 | 110 | 110 |
| | Average diameter, $\phi_M$, of particulates, in μ | 12 | 7 | 7 | 4 |
| Mixture of formation | pH | 7 | 7 | 7 | 7 |
| | Proportion of spheroidal particles with respect to initial sol (with respect to total solids, calculated as Al₂O₃) | 76 | 90 | 40 | 76 |
| | Calcination temperature of the particulates, in °C. | 950 | 950 | 950 | 950 |
| Proportions of resultant spheroidal particulates | Total pore volume, in cm³/g | 1.20 | 1.30 | 0.70 | 0.80 |
| | Micropore volume, in cm³/g | 0.60 | 0.60 | 0.60 | 0.60 |
| | Macropore volume, in cm³/g | 0.60 | 0.70 | 0.10 | 0.20 |
| | Average macropore volume, in μ | 4 | 1.5 | 0.5 | 0.5 |
| | Specific surface, in m²/g | 100 | 100 | 100 | 100 |
| | Breaking strength, in kg | 2 | 1.5 | 6.5 | 7 |

TABLE II-continued

| | | 8 | 9 | 10 | 11 |
|---|---|---|---|---|---|
| Initial sol | Alumina concentration, calculated as $Al_2O_3$ | 12 | 12 | 12 | 15 |
| Spheroidal particulates | Alumina phase | gamma | delta | theta | theta |
| | Micropore volume, in $cm^3/g$ | 0.65 | 0.65 | 0.65 | 0.65 |
| | Specific surface, in $cm^2/g$ | 160 | 90 | 110 | 110 |
| | Average diameter, $\phi_M$, of particulates, in $\mu$ | 7 | 7 | 7 | 7 |
| Mixture of formation | pH | 4 | 4 | 4 | 4 |
| | Proportion of spheroidal particles with respect to initial sol (with respect to total solids, calculated as $Al_2O_3$) | 76 | 76 | 76 | 76 |
| | Calcination temperature of the particulates, in °C. | 950 | 950 | 950 | 950 |
| Proportions of resultant spheroidal particulates | Total pore volume, in $cm^3/g$ | 1.10 | 1.10 | 1.10 | 1.10 |
| | Micropore volume, in $cm^3/g$ | 0.75 | 0.75 | 0.75 | 0.75 |
| | Macropore volume, in $cm^3/g$ | 0.35 | 0.35 | 0.35 | 0.35 |
| | Average macropore volume, in $\mu$ | 1 | 1.5 | 1.5 | 1.5 |
| | Specific surface, in $m^2/g$ | 110 | 90 | 100 | 100 |
| | Breaking strength, in kg | 4.4 | 4.5 | 4 | 5 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Spheroidal alumina particulates having bifold porosity, and comprising a total pore volume ranging from about 0.55 to 1.7 $cm^3/g$; a micropore volume ranging from about 0.5 to 1 $cm^3/g$, with a micropore having a pore diameter of less than 0.06 microns; a macropore volume ranging from about 0.05 to 0.7 $cm^3/g$, with a macropore having a pore diameter of greater than 0.06 microns; a macropore mean diameter ranging from about 0.1 to 10 microns; a specific surface ranging from about 80 to 350 $cm^2/g$; a breaking strength in excess of 1 kg; and the alumina comprising said spheroidal particulates being essentially completely in at least one of the phases eta, gamma, delta and theta.

2. A process for the preparation of spheroidal alumina particulates having bifold porosity, comprising (i) intimately admixing, at a pH of less than about 7.5, (a) a sol of a member selected from the group consisting of ultrafine boehmite and psuedo-boehmite, said sol being devoid of amorphous alumina and the concentration by weight thereof, in content by weight of $Al_2O_3$, being between 5 and 25%, with (b) from 30 to 95% by weight, based upon the total solids content of the admixture, of spheroidal alumina particulates essentially completely in at least one of the phases eta, gamma, delta and theta, such particulates having a micropore volume ranging from about 0.4 to 1 $cm^3/g$, a specific surface ranging from about 100 to 350 $m^2/g$, and particle diameters ranging from about 1 to 50 microns; (ii) prilling said intimate admixture into spheroidal particulates and gelling the same; and thence, (iii) recovering, drying and calcining said gelled particulates at a temperature of from 550° to 1100° C.

3. The process as defined by claim 2, wherein the intimate admixing is at a pH of from 3 to 7.

4. The process as defined by claim 2, wherein the sol comprises fibrillar ultrafine boehmite comprising single crystals.

5. The process as defined by claim 4, wherein the boehmite comprises single crystals developed essentially in a single crystallographic direction in the form of long and narrow ribbons ((020) and (123) reflections highly attenuated, (105) of normal intensity) and single crystals in the form of long and very narrow ribbons ((hkl) reflections absent, (012) halo and clear (200) reflection).

6. The process as defined by claim 5, said crystals having a length of from about 500 to 5000 Å, and a width and thickness of from about 10 to 100 Å.

7. The process as defined by claim 6, said crystals having a specific surface of from 50 to 600 $m^2/g$.

8. The process as defined by claim 4, the boehmite being characterized by Debye-Scherrer diagram of ultrafine lamellar boehmite displaying a plurality of reflections characteristic of tabular faces and exhibiting the (002) cleavage corresponding to the planes of the oxydrils of boehmite well crystallized in the form of:
  (i) rhombic platelets ((002) and (105) reflections partially extinct, (008) completely extinct),
  (ii) elongated rhombic platelets in the (110) direction (doublet (020), (105) unresolved, reflections (002) and (008) of normal intensity), and
  (iii) long and broadened ribbons ((002) reflections partially extinct, (008) and (105) totally extinct).

9. The process as defined by claim 2, wherein the boehmite sol is obtained by heating an aqueous dispersion of alumina in the presence of a dissociated, strong monovalent acid.

10. The process as defined by claim 2, wherein the sol is obtained from a suspension or cake of hydrated amorphous alumina gel containing up to 35% by weight alumina, calculated as $Al_2O_3$, and an amount of monovalent acid ions, based upon the $Al_2O_3$ molecules, ranging from 0.05 to 0.5.

11. The process as defined by claim 2, wherein the sol comprises a pseudo-boehmite selected from the group consisting of b, a and recrystallized pseudo-boehmite.

12. The process as defined by claim 2, wherein the spheroidal particulates (ii) have a micropore volume between 0.7 and 1 $cm^3/g$.

13. The process as defined by claim 2, wherein at least 50% of the spheroidal particulates (ii) have a diameter $\phi$ on the order of an average value $\phi_M$ such that $\phi = \phi_M \pm 20\% \, \phi_M$.

14. The process as defined by claim 2, wherein the spheroidal particulates (ii) have been ground.

15. The process as defined by claim 2, wherein the spheroidal alumina particulates (ii) have been prepared by precipitation of an aqueous solution of an aluminum salt with a solution of an alkaline alumina, atomization of the precipitate obtained, the suspension of same in an aqueous solution having a pH between 4.5 and 7, the atomization and drying of the alumina slurry obtained, and washing, drying and calcination at a temperature between 550° and 1100° C.

16. The process as defined by claim 2, wherein the spheroidal alumina particulates (ii) have been prepared by precipitation of an alumina gel at a pH between 7.5 and 11, followed by washing, centrifuging, suspension of same in aqueous medium, rapid dehydration in a stream of hot gas and calcination at a temperature between 550° and 1100° C.

17. The process as defined by claim 2, wherein the spheroidal alumina particulates (ii) have been prepared by precipitation of an alumina gel at a pH between 7 and 10.5, aging of the precipitate at a pH between 10 and 11, homogenization, atomization at 250°–550° C. of the slurry obtained, and calcination at a temperature between 550° and 1100° C.

18. The process as defined by claim 2, wherein the spheroidal alumina particulates (ii) have been prepared by precipitation of an alkaline alumina with a mineral acid at a temperature between 30° and 75° C., aging in a second reactor at 30°–75° C. at a pH of about 7, recycling of the resultant slurry, filtering, washing, drying, and calcination at a temperature between 550° and 1100° C.

19. The process as defined by claim 2, wherein the spheroidal alumina particulates (ii) have been prepared by atomization, followed by calcination at a temperature between 550° and 1100° C., of an aqueous suspension of a member selected from the group consisting of ultrafine boehmite, pseudo-boehmite and amorphous alumina.

20. The process as defined by claim 2, wherein the spheroidal alumina particulates (ii) have been prepared by treatment, with a base decomposeable into volatiles, of an aqueous dispersion of a member selected from the group consisting of ultrafine boehmite, pseudo-boehmite and amorphous alumina, followed by drying and calcining at a temperature between 550° and 1100° C.

21. The process as defined by claim 20, wherein the treatment with the decomposeable base is effected by adjusting the pH of the dispersion to a value between about 8 and 9.5.

22. The process as defined by claim 2, wherein the spheroidal alumina particulates (ii) have been obtained by preparation of an aqueous suspension of alumina at least partially in the form of ultrafine boehmite by treating an activated alumina powder having a poorly crystallized or amorphous structure, or both, in an aqueous medium having a pH less than 9; next atomizing the resultant suspension; and thence calcining same at a temperature between 550° and 1100° C.

23. The process as defined by claim 22, wherein the activated alumina powder has been obtained via rapid dehydration of an aluminum hydroxide or oxyhydroxide in a stream of hot gas.

24. The process as defined by claim 22, wherein the aqueous medium comprises a member selected from the group consisting of water, acid and a salt which dissociates in water.

25. The process as defined by claim 2, wherein the prilling and gelling is effected by dripping the admixture into a liquid immiscible with water.

26. The process as defined by claim 25, said immiscible liquid comprising a gelling agent.

27. The process as defined by claim 25, said immiscible liquid being selected from the group consisting of petroleum, kerosene, dodecylbenzene, trichloroethane, inert organic solvent, hydrocarbon and mineral oil.

28. The process as defined by claim 27, wherein the gelling agent is selected from the group consisting of ammonium chloride, ammonia, ammonium carbonate, long chain fatty amines, hexamethylene tetramine, and urea.

29. The process as defined by claim 25, wherein the admixture is dripped into a column containing an upper phase comprising petroleum and a lower aqueous phase comprising an aqueous ammonia solution, the prilling being effected in the upper phase and the gelification essentially in the lower phase, and with the temperature of the petroleum being about ambient and the pH of the ammonia solution being at least 9.

30. The process as defined by claim 25, said immiscible liquid being adapted to dehydrate the droplets of the admixture.

31. The process as defined by claim 2, wherein the prilling and gelling is effected by forming droplets of the admixture, admixing said droplets with at least one water soluble monomer, the non-reticulated polymer thereof being soluble in water in the form of a gel, and next dispersing the drops thus formed in a hot, fluid medium.

32. The process as defined by claim 2, wherein the concentration of the sol is between 10 and 15%.

33. The process as defined by claim 2, the admixture comprising from 65 to 90% by weight of the particulates (ii).

34. The process as defined by claim 2, wherein the spheroidal alumina particulates have a diameter between 5 and 10 microns.

35. A catalyst comprising the spheroidal alumina particulates as defined by claim 1.

36. A catalyst carrier comprising the spheroidal alumina particulates as defined by claim 1.

* * * * *